United States Patent [19]

Humlong

[11] 4,282,993
[45] Aug. 11, 1981

[54] QUICK RELEASE BICYCLE BASKET AND CARRIER RACK THEREFOR

[75] Inventor: Robert F. Humlong, Maysville, Ky.

[73] Assignee: Wald Manufacturing Co., Inc., Maysville, Ky.

[21] Appl. No.: 968,750

[22] Filed: Dec. 13, 1978

[51] Int. Cl.³ .............................................. B62J 7/02
[52] U.S. Cl. .................................. 224/31; 224/32 R; 224/39
[58] Field of Search ............... 224/31, 30 R, 30 A, 224/32 R, 33 R, 33 A, 36, 35, 39, 32 A, 41

[56] References Cited

U.S. PATENT DOCUMENTS

| | | | |
|---|---|---|---|
| 2,287,531 | 6/1942 | Ong | 224/36 |
| 2,457,624 | 12/1948 | Aleks | 224/36 |
| 2,492,595 | 12/1949 | Rhoer | 224/41 |
| 2,498,446 | 2/1950 | Pawsat | 224/36 |
| 2,700,493 | 1/1955 | Meier | 224/36 |
| 3,311,277 | 3/1967 | Gordon | 224/35 |
| 3,517,867 | 6/1970 | Fritz et al. | 224/31 |
| 3,603,549 | 9/1971 | Brilando | 224/35 X |
| 3,853,253 | 12/1974 | Hawkins et al. | 224/39 |
| 3,874,574 | 4/1975 | Heise | 224/32 A X |
| 4,003,508 | 1/1977 | Hoops | 224/31 |
| 4,056,219 | 11/1977 | Hine | 224/41 X |
| 4,125,213 | 1/1978 | Watkins | 224/32 A X |

FOREIGN PATENT DOCUMENTS

| | | | |
|---|---|---|---|
| 15316 | 4/1926 | Netherlands | 224/41 |
| 72512 | 9/1947 | Norway | 224/32 A |
| 33981 | 3/1905 | Switzerland | 224/41 |
| 708207 | 4/1954 | United Kingdom | 224/41 |

Primary Examiner—David A. Scherbel
Assistant Examiner—Jerold M. Forsberg
Attorney, Agent, or Firm—Wood, Herron & Evans

[57] ABSTRACT

A bicycle basket is provided with means which engage portions of a carrier rack secured to and carried by a bicycle wherein the basket includes a pair of oppositely extending rack engaging hooks on one of its upstanding walls, and a rack engaging cam latch on the bottom wall thereof for securely, though releasably, anchoring the basket relative to the carrier rack.

6 Claims, 6 Drawing Figures

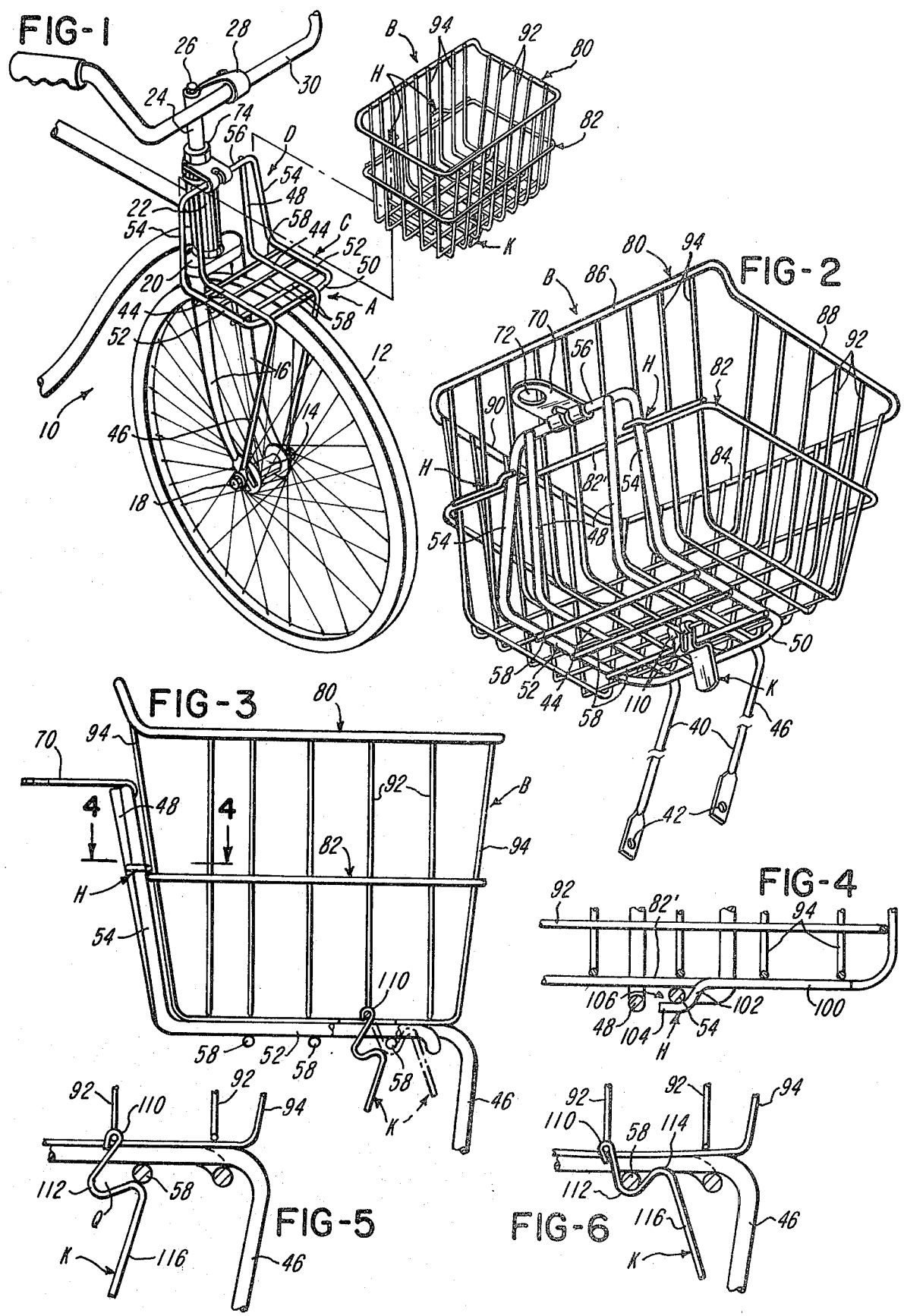

QUICK RELEASE BICYCLE BASKET AND CARRIER RACK THEREFOR

BACKGROUND OF THE INVENTION

1. Field of the Invention

The field of the invention relates to load carrying baskets for bicycles and the like which are adapted to be securely, though releasably, anchored to a carrier rack which is secured to and carried by the bicycle.

2. Description of the Prior Art

U.S. Pat. No. 3,517,867 to A. J. Fritz et al discloses a detachable tricycle basket which is removably associated with and between a pair of laterally spaced support frames which are secured to and disposed in spanning relationship with respect to the rear wheels of a tricycle. The opposite side edges of the upper peripheral wires of the basket are provided with clamping means hingedly secured thereto for movement between locking and unlocking relationship with respect to a pair of elevated, laterally spaced arms which are secured to and carried by the support frames. The bottom of the basket is supported on a pair of laterally spaced U-shaped bottom members which depend from and extend between transversely extending rods which span the spaced support frames.

U.S. Pat. No. 3,603,549 of F. P. Brilando et al discloses a universal support for the front basket of a bicycle wherein the support is secured to and carried solely by the bicycle stem to which the handlebars are secured, said support including upstanding front and rear walls and a flat bottom wall which engage corresponding portions of a wire basket associated therewith. The support includes a substantially vertically disposed basket-clamping mechanism which is yieldably and normally urged downwardly by a spring. The clamp is adapted to be elevated against the counterforce of the spring by a lifting force applied to a handle during those periods of time when a basket is being associated with the support whereby the clamp will engage the uppermost peripheral wire at the top of the rear wall of the basket, thereby securing the basket between the upstanding front and rear walls of the support.

U.S. Pat. No. 4,056,219 of E. K. Hine, Jr. discloses a Handlebar Pack and Support Therefor which comprises a cantilever support which projects over and forwardly from the center portion of a handlebar wherein said support includes a pair of laterally spaced forwardly projecting forked side members which extend in a substantially horizontal direction and a pair of depending members each of which are adapted to be received within elongate pockets and wherein a U-shaped elastic member is adapted to engage the lower ends of said depending members to resiliently secure said ends relative to the stem of a bicycle for stabilizing the support.

U.S. Pat. No. 2,492,595 to L. Rhoer discloses an article carrier for velocipedes in the form of a basket which is fastened to the handlebar of a velocipede by support means which are an integral part of the basket, per se, viz, a pair of laterally spaced hook-like members, portions of which are adapted to engage the horizontal portions of the handlebar on opposite sides of the handlebar stem, and other portions of which define a U-shaped loop which fits around the upstanding stem-supporting-post of the velocipede to which the U-shaped loop is secured by means of a locking pin which spans the legs of the U-shaped loop beyond the stem-supporting-post, said locking pin being releasably maintained by means of a pivotally mounted wire catch when in a lowered substantially horizontal position. The lower portion of the rear wall of the basket is provided with a transverse strut having a U-shaped portion disposed centrally therein which is adapted to loosely and abuttingly engage the forward surface of the steering post housing. The basket of this reference is subject to movement and vibration relative to the velocipede frame since the basket is pivotally secured relative to the steering post housing by the U-shaped loop which loosely engages it.

U.S. Pat. No. 2,700,493 to R. C. Meir, Jr. discloses a bicycle basket which is adapted to be secured to and detached from a bicycle by means of a pair of support legs of the basket which are pivotally mounted for movement between operative, lowered and inoperative raised positions, and which when in raised position detached from a bicycle provides a compact unit. A pair of hub-supported leg-receptive brackets are secured to and carried by the bicycle hub to telescopically receive the legs when in operative lowered position relative to the basket. The basket also includes a pair of laterally spaced rearwardly extending U-shaped arms 26 and 27 which are disposed on opposite sides of the steering post housing whereby to be received within complimentary sockets which are secured to, carried by, and depend from and relative to the central horizontal portion of a handlebar. The attaching legs which are pivotally secured to the bottom wall of the basket are adapted to be pivoted upwardly to a substantially horizontal position in parallelism with the bottom of the basket when it is removed from the bicycle wherein the length of said legs project a substantial distance beyond the rear wall of the basket and beyond the depending U-shaped mounting leg which is secured to the upper portion of the rear wall of the basket.

When the basket has been disconnected from the bicycle those portions of the leg-receptive brackets which are secured to and project upwardly from the hub shaft are disposed in upwardly inclined spaced relationship with respect to the bicycle hub until and unless removed from the hub.

U.S. Pat. No. 3,853,253 of H. C. Hawkins et al discloses a bag carrier for bicycles which is clamped to the frame member by a first pair of semi-circular members for grasping the frame member in a first direction, and a second pair of semi-circular members for grasping the frame member in a second and opposing direction, said attachment means being fabricated from wire rods which having been initially formed to the desired shape will retain said shape when subjected to normal use which contemplates support of the weight of a bag or the like which is received within and suspended from the hanger.

SUMMARY OF THE INVENTION

The invention relates to a load carrying basket which includes simple, yet highly effective, means for securely though removably anchoring the basket to a carrier rack which is secured to and carried by the shaft of the front wheel hub and the fork tube wherein the mounting rack is adapted to remain on and comprise part of the bicycle structure during those periods of time when the basket is removed therefrom. The rear wall of the basket is provided with a pair of oppositely extending carrier-rack engaging hooks and a bottom wall which is provided with a hingedly mounted latch which is selectively movable into and out of engagement with a portion of the bottom of the carrier rack whereby the latch when engaged with the rack is locked thereto by reason of the inherent resilience of the bottom of the basket defining wire webs.

The basket is positively anchored to the carrier rack against accidental or unintentional dislodgment therefrom and in such a manner as to preclude any looseness or rattling of the basket relative to the carrier rack.

The location of the latching clamp while conveniently accessible to the bicycle owner is nevertheless so positioned and located whereby to be protected from unauthorized manipulation; however, even during those periods of time when the clamping means have been released, the basket will nevertheless be secured against accidental or unintentional disengagement from the carrier rack by reason of the wedging relationship between the basket hooks and those portions of the carrier rack which are engaged thereby.

DESCRIPTION OF THE DRAWINGS

FIG. 1 is a perspective view of the front portion of a bicycle illustrating the carrier rack of the present invention operatively associated therewith and illustrating the basket of the present invention in disengaged, spaced relationship with respect to the rack.

FIG. 2 is a perspective view of the rear, bottom, and right side of the basket and carrier rack of FIG. 1 in interconnected relationship.

FIG. 3 is an elevational view of the right side of FIG. 2.

FIG. 4 is a sectional view taken on line 4—4 of FIG. 3.

FIGS. 5 and 6 are side elevational views of the latching clamp of FIG. 3 in the process of being secured relative to a bottom strut of the carrier rack.

DESCRIPTION OF THE PREFERRED EMBODIMENT

The numeral 10 denotes generally the front portion of a conventional bicycle which includes a front wheel 12, the hub 14 of which includes an elongate shaft which extends between and is secured to the lower end of a pair of laterally spaced fork tines 16 by means of retaining nuts 18 on the ends of the hub shaft. The upper end of the forked tines terminate in a connector member 20 from which a conventional fork tube (not illustrated) projects upwardly within and through bicycle frame housing 22. A handlebar stem 24 is secured to and carried by the fork tube within housing 22, such as by way of example, an expander bolt 26 which when tightened secures the stem to the fork tube. The central portion of a conventional handlebar 30 is received in and secured to the handlebar post 28 of the stem 24.

The present invention is neither directed to nor concerned with the particular structural details of the front portion of the bicycle, per se.

The device of the invention includes a carrier rack designated generally by the letter A and a basket therefor designated by the letter B.

In the preferred embodiment of the invention, the carrier rack includes a pair of laterally spaced legs 40, the lower ends of the depending portions 46 of which are flattened and provided with shaft-receptive apertures 42 which are adapted to receive the outer ends of the hub shaft after retaining nuts 18 have been removed and thereafter reapplied to the shaft for securely, though releasably, anchoring the lower ends of legs 40 relative to the hubs and lower ends of the fork tines as clearly illustrated in FIG. 1. Legs 40 are formed whereby to include an intermediate portion 44 between upstanding rearward portion 48 and the depending forward portion 46.

A second substantially L-shaped framework is defined by an elongate rod-like member formed whereby to define a front leg 50 and a pair of laterally spaced side legs 52 which collectively define a base or horizontal portion C; a pair of laterally spaced upwardly converging side legs 54; and a substantially horizontal upper rear leg 56 wherein legs 54—54 and 56 collectively define, along with upstanding legs 48, an upstanding rear wall portion D.

A plurality of transversely extending laterally spaced rods 58 are disposed in spanning relationship and beneath portions 52—52 and portions 44—44 of the carrier, as clearly illustrated in FIGS. 1 and 2.

A neck bracket 70 is pivotally secured to upper leg 56 of the said L-shaped framework, said bracket having an aperture 72 therethrough dimensioned to engage the fork tube at a location beneath the fork cone lock nut 74 as illustrated in FIG. 1, wherein said nut securely anchors leg 56 of the carrier rack A to the bicycle. From the foregoing it will be noted that the carrier rack is thus securely fastened to the bicycle whereby the upstanding rear wall thereof is disposed in spaced relationship with respect to upstanding housing 22 and wherein the bottom wall of the rack is disposed in spaced relationship above the outer surface of a tire on the front wheel 12 thereby providing a rugged carrier rack which is, per se, quite capable of supporting considerable loads. It will be understood that the carrier rack is fabricated from substantially round metal rod-like material characterized by its ability to retain the shape to which it has been intially formed as in FIGS. 1 and 2 against distortion when subjected to loading to which such carrier racks are subjected in normal use.

With particular reference now to FIGS. 2, 3, and 4, it will be noted that the basket B comprises a continuous top frame 80 and a continuous center frame 82 which are disposed in spaced relationship and which define the front, rear, and side edges 84, 86, 88, and 90 respectively of the basket.

A plurality of U-shaped webs 92 and 94 are secured to and carried by top frame 80 and center frame 82 wherein webs 92 define the side and transverse bottom wall portions of the basket, and wherein webs 94 define the front, bottom, and rear walls of the basket.

As best illustrated in FIGS. 2 and 4 the rear wall-defining portions of certain of the U-shaped webs 94 adjacent center frame 82 are provided with a pair of laterally spaced, opposed, hook-like members H which in the preferred embodiment of the invention comprise a length of rigid wire bent whereby to form an elongate mounting portion 100 whcih is permanently secured, such as by means of welding, to adjacent webs 94 of the rear wall of the basket as illustrated in FIGS. 2 and 4 and intermediate portion 102 the outer end of which defines a terminal portion 104 which is disposed in substantially parallel spaced relationship with respect to center frame 82 thereby forming a throat 106 for the reception of the upstanding inwardly converging legs 54 of the carrier rack.

Since hooks H are disposed in opposing relationship, as best illustrated in FIGS. 1 and 2, it will be noted that as the basket is associated with the carrier rack with hooks H engaging with the rack rods 54, the basket will be wedged into tight mounting relationship with respect to the rear upstanding portion D of the carrier rack.

The bottom wall of the basket is adapted to be securely, though releasably, anchored to the bottom wall C of the carrier rack by means of a clamp K, one end of which is pivotally mounted as at 110 to the bottom of a U-shaped web 92 and preferably said mounting end is bifurcated, as illustrated in FIGS. 2, whereby to engage a web 92 on opposite sides of a web 94 thereby effectively precluding the clamp from sliding along web 92.

The clamp includes a substantially S-shaped intermediate portion defined by U-shaped loops 112 and 114 and a terminal depending handle portion 116. U-shaped loop 112 defines a socket Q into which a transverse rod of base C of the carrier rack is received as in FIG. 6 incident to the application of a counterclockwise movement of handle portion 116 of the clamp as it is illustrated in FIGS. 3, 5, and 6. The relationship of U-shaped portions 112 and 114 are such that the outer surface of 114 will initially engage and then snap laterally under rod 58 of the carrier rack bottom as the latch moves from the unlatched position of FIG. 3 to the intermediate position of FIG. 5 to the fully latched position of FIG. 6, it being noted that as portion 114 passes under rod 58 the inherent springability of the wire from which webs 92 and 94 are fabricated produces a powerful and positive counterforce which must be overcome as portion 114 of the clamp is forced beneath rod 58 whereby socket Q will be maintained under tension and in positive contacting relationship with said rod when in the position of FIG. 6 thereby positively anchoring the basket relative to the carrier rack against any and all relative movement therewith. The basket thus mounted to the carrier frame is so securely anchored relative to the carrier rack as to, for all practical purposes, become an integral part thereof—however, the basket may be quickly removed from the rack incident to the application of a positive force in a clockwise direction against handle portion 116 of the clamp K of FIG. 6 sufficient to move the clamp about its connection at 110 relative to rod 58 against the resilient counterforce provided by the inherent springiness of the basket web.

When removed the basket may be stored or utilized to transport goods to and from the carrier rack, it being noted that the means by which the basket is anchored to the carrier rack are located exteriorly of the rear and bottom walls of the bakset in such a manner as not to interfere with the contents of the basket when mounted or unmounted to carrier rack A.

The upwardly converging side legs 54 of rack A define a pair of upwardly convergent, laterally spaced tracks which are adapted to be slideably engaged by the opposed hooks H of basket B as it is lowered onto the rack. The inclination of the tracks is such that in the preferred embodiment of the invention the hooks will literally support the rear wall of the basket against sidewise and further downward movement relative to the rack as the bottom of the basket approaches contact with the bottom portion of the rack. When latch K has been moved to the locked position of FIGS. 2 and 6 the bottom of the basket is securely anchored to the rack whereby to positively preclude any relative movement between the basket and rack.

Since latch K is pivotally secured to the bottom of the U-shaped web 92 which is fabricated from wire, the latch is, in effect, resiliently urged and maintained in latching relationship with respect to the heavier rack rods 54 when the latch has been advanced whereby to cause portion 114 thereof to pass under rod 58 thereby seating said rod in socket Q of the latch where it will be maintained in latched position against accidental or unintentional dislodgment therefrom.

As the latch is moved from unlatched to latched position, or conversely, from latched to unlatched position, a deliberate, positive, intentional force must be applied to the lower end 116 thereof of sufficient magnitude as to cause portion 114 to move to one side or the other of dead center as determined by transverse strut or rod 58. Once the seat Q of FIG. 5 has been seated, as in FIG. 6, as the result of the application of a counterclockwise force to outer end 116 of the latch, the latch will remain in latched condition against accidental or unintentional displacement until and unless a positive clockwise force is applied for forcing portion 114 of the latch beneath strut or rod 58.

What is claimed is:

1. A basket assembly for a bicycle or the like, said assembly comprising:

an L-shaped carrier rack having a substantially horizontal bottom portion and an upstanding rear portion, said rear portion including a pair of upwardly convergent, laterally spaced, frame members;

a basket having front, rear, side and bottom walls defined by a circumferential top frame, a circumferential center frame, and two sets of U-shaped webs the upstanding legs of which are fixedly secured to said top and center frames for defining the upstanding front, rear, and side walls of the basket and wherein the bottom of said U-shaped webs define the bottom wall of the basket, hook-defining means projecting from the rear wall of the basket, said hook defining means including terminal portions spaced laterally and disposed in spaced relationship with respect to said center frame of said basket, each said terminal portion of said hook defining means opening toward the other spaced terminal portion and being slideably engageable with the upwardly convergent frame members of the rack as the basket is lowered onto the rack whereby the downward movement of the basket relative to the rack is limited by a wedging action between the hook defining members and the upwardly convergent frame members so as to dispose the bottom wall of the basket in overlying relationship with the horizontal bottom portion of the rack; and latch means depending from the bottom wall of the basket for pivotal movement between latched and unlatched positions relative to the bottom portion of the rack, said pivoted latch being required to overcome the resiliency of one of the latch elements in order to move from latched to unlatched position or from unlatched to latched position, said latch means when in latched position engaging the horizontal bottom portion of the rack for anchoring the basket to the rack and insuring against displacement therefrom.

2. A basket assembly as called for in claim 1, wherein the latch means which depend from the bottom wall of the basket includes an upper end which is pivotally secured to and carried by one of the U-shaped webs which define the bottom of a basket, a lower end which defines a hand grip member, and an intermediate substantially S-shaped portion.

3. A basket assembly as called for in claim 1, wherein the horizontal bottom portion of the L-shaped carrier rack includes a transversely extending rod, and wherein the basket latch is pivotally mounted for movement between latched and unlatched relationship with respect to said rod for alternatively disposing the bottom of the basket in connected or unconnected relationship with respect to the bottom wall of the rack.

4. A basket assembly as called for in claim 3, wherein movement of the latch from unlatched to latched position is yieldingly opposed by the inherent resilience of the bottom portions of the U-shaped webs to which the latch is pivotally connected, as the intermediate portion thereof is forced under the said transversely extending rod of the rack.

5. A basket assembly as called for in claim 1, wherein the carrier rack includes means for anchoring the upstanding rear portion thereof to the fork tube of a bicycle and other means for supporting the forward end of the bottom portion thereof on the shaft of the wheel hub of a bicycle.

6. A basket assembly as called for in claim 5, wherein the means for achoring the rack to the fork tube includes a fork-tube-bracket which is secured to and carried by the upper end of the upstanding rear portion of the carrier rack and wherein the means for supporting the forward end of the bottom portion of the rack on the shaft of the wheel hub includes a pair of laterally spaced support legs depending from the forward end of the bottom portion of said carrier rack.

* * * * *